United States Patent [19]
Karikawa

[11] 3,740,695
[45] June 19, 1973

[54] CAMERA PHOTOFLASH DEVICE

[75] Inventor: Tohru Karikawa, Tokyo, Japan

[73] Assignee: Asahi Kogaku Kogyo Kabushiki Kaisha, Tokyo-tu, Japan

[22] Filed: Mar. 3, 1971

[21] Appl. No.: 120,419

[30] Foreign Application Priority Data
June 11, 1970 Japan.............................. 45/57691

[52] U.S. Cl.............. 339/45 T, 95/11.5 R, 240/1.3
[51] Int. Cl........................ G03b 15/05, H01r 13/62
[58] Field of Search............ 339/45 R, 45 M, 45 T, 339/75, 91, 147 R, 147 P; 240/1.3, 37.1; 95/11, 11.5

[56] References Cited
UNITED STATES PATENTS

| | | | |
|---|---|---|---|
| 3,447,433 | 6/1969 | Wick et al. ...................... | 240/1.3 X |
| 3,447,435 | 6/1969 | Winkler ........................... | 95/11.5 R |
| 3,520,237 | 7/1970 | Engelsmann et al................ | 95/11 R |
| 3,353,465 | 11/1967 | Peterson et al. .................. | 95/11.5 R |
| 3,457,845 | 7/1969 | Huber ........................... | 339/45 T X |

Primary Examiner—Marvin A. Champion
Assistant Examiner—Terrell P. Lewis
Attorney—Stanley Wolder

[57] ABSTRACT

A flash gun and flash cube mounting and coupling mechanism includes a metal shoe mount located on the camera and a film advance rotated drive member is positioned below the shoe and has a square axial bore in which a corresponding metal shaft is slidable and spring urged to a raised position with its top level with that of the bore. A flash cube adapter includes a bottom metal coupler slideably releasably engaging the shoe and an insulator outer body member fixed to the coupling member and an insulator socket member rotatable in the body member. A second metal shaft is rotatable with and slideably engages the socket member and is spring raised and is urged to a depressed condition with the insertion of a flash cube into engagement with the first shaft and the drive member bore. Contacts in the body member are connected to the first shaft and the coupling member. A flash gun includes a tube provided with a coupling releasably engaging the shoe and having a resiliently depressed contact ball urged into engagement with the first shaft.

7 Claims, 3 Drawing Figures

PATENTED JUN 19 1973 3,740,695
FIG-1 FIG-2
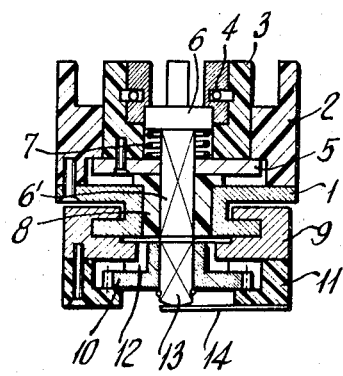
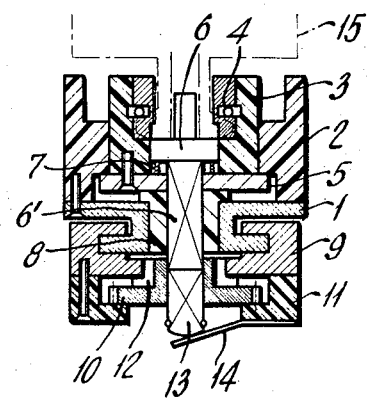
FIG-3
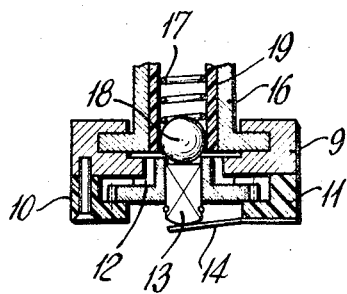
INVENTOR
TOHRU KARIKAWA
BY Henley Wolder
ATTORNEY

3,740,695

CAMERA PHOTOFLASH DEVICE

BACKGROUND OF THE INVENTION

The present invention relates generally to improvements in camera photoflash devices and it relates more particularly to an improved electrical and mechanical coupling mechanism on a camera which facilitates the selective use of a flash cube or a conventional flash gun.

The conventional camera generally is provided with an arrangement whereby it may be used with a flash cube which is rotated to an unfired section with the advance of the film or is provided with a means for mounting and synchronizing a conventional flash gun. However, in many cases it may be desired to selectively employ with the camera a camera mounted conventional flash gun or a flash cube and such a system or convenience is not afforded by the conventional camera provided with a flash synchronizing network.

SUMMARY OF THE INVENTION

It is a principal object of the present invention to provide an improved camera.

Another object of the present invention is to provide in a camera an improved photoflash mechanism.

Still another object of the present invention is to provide in a camera an improved mechanism which permits the use with the camera of a flash cube or a conventional flash gun.

A further object of the present invention is to provide an improved mechanism of the above nature characterized by its reliability, ruggedness, convenience and ease of use, versatility and low cost.

The above and other objects of the present invention will become apparent from a reading of the following description taken in conjunction with the accompanying drawing which illustrates a preferred embodiment thereof.

In a sense the present invention contemplates the provision, in a camera, of a photoflash device coupling and drive mechanism comprising a rotatable drive member having an axial bore of non-circular transverse cross-section, a first contact element registering with said bore, and means including a first coupling member for releasably engaging a photoflash device having a second contact element separably engaging said first contact element.

The first coupling member advantageously includes a pair of laterally spaced confronting metal channels defining a shoe mount and the drive member comprises a gear underlying the shoe and having a square axial bore which is slideably engaged by a first metal shaft, the gear being coupled to the camera film advance whereby to rotate the gear 90° for each frame advance. A spring urges the shaft to a raised position with its top at the level of the top of the bore. A flash cube adapter includes a second metal coupling member releasably engaging the shoe, and an insulating body member is mounted atop the second coupling member and a flash cube engaging socket member of insulating material is rotatably supported by the body member which likewise supports a pair of contact elements. A square shaft is rotatable with the socket member and is axially movable into engagement with the first shaft and the drive member bore, and is spring retracted to a position out of engagement with the bore and is advanced with the insertion of a flash cube into the socket member. The contact elements are connected to the energizing network through the shafts and the coupling members respectively. A conventional flash gun may be substituted for the flash cube adapter and includes a metal post provided at its base with a metal coupling member releasably engaging the shoe, and a spring metal ball is coaxial with the metal tube and separated therefrom by a telescoping insulating tube.

The improved flash device coupling arrangement is simple, rugged and reliable and is easy and convenient to use.

BRIEF DESCRIPTION OF THE DRAWING

FIG. 1 is a vertical medial sectional view of the improved coupling mechanism illustrated with the associated flash cube adapter and in the absence of a flash cube;

FIG. 2 is a view similar to FIG. 1 illustrated in a condition having an inserted flash cube; and FIG. 3 is a fragmentary vertical medial sectional view of the improved coupling mechanism illustrated with an associated flash gun.

DESCRIPTION OF THE PREFERRED EMBODIMENT

Referring now to the drawing, and particularly FIGS. 1 and 2 thereof which illustrates a preferred embodiment of the present invention adapted to the use of a flash cube, the reference numeral 9 generally designates a metal coupling seat or shoe mount positioned on the associated camera and accessible for slidable engagement by a mating coupling member, the shoe mount 9 including a pair of laterally spaced metal channel sections have confronting openings. Secured to and positioned below shoe mount 9 is a ring 11 of insulating material and which supports a metal drive member 10, such as a gear, which is provided with an axial hub having a square axial bore extending therethrough. Drive member 10 is restricted against axial movement by an insulator bushing 12 of L-shaped cross-section engaging the hub, the top face of driver member 10 and the lower inside corners of shoe 9. A square metal shaft 13 with a rounded bottom face slidably engages the vertical bore in drive member 10 and is urged upwardly to a position with its top level with the top of the hub by an electrode defining spring arm 14 secured to the underface of ring 11 and bearing on the underface of shaft 13, the further upward movement of shaft 13 being limited by lugs projecting from shaft 13 below drive member 10. It should be noted that drive member 10 is rotated 90° with each film frame advance by a mechanism of known construction associated with the camera.

The flash cube adapter includes a body member 2 formed of insulating material affixed to the top of a metal coupling 1 having outwardly directed coupling legs which slidably engage the channels in shoe mount 9 to releasably connect the adapter to the camera. The body member 2 has a central circular bore having a flash cube receiving and drive or socket member 3 of insulating material journalled therein. A coaxial socket defining bore is formed in drive member 3 and has opposite grooves in its inner face for engaging a spline on the flash cube stem, and a spring member 4 for releasably locking the flash cube in the drive member 3 is positioned in the drive member socket.

A metal disc 5 having a square central opening is affixed to the underface of drive member 3 and engages a downwardly directed shoulder on body member 2 to restrict the upward movement of drive member 3. An insulator bushing 8 is disposed in a central opening in coupling 1 and has a bottom coplanar with the bottom of coupling 1 and a top flange sandwiched between the top face of coupling 1 and the underface of disc 5. A square metal shaft 6' slidably engages the corresponding aligned square bores in bushing 8 and disc 5 and terminates at its top in an enlarged circular metal head 6 slidably registering with the lower part of the bore in socket member 3 and limited against axial movement beyond a predetermined level by an internal shoulder in the socket member bore, at which level the underface of shaft 6' is coplanar with the underfaces of bushing 8 and coupling 1. A helical metal compression spring 7 encircles the upper part of shaft 6' and is entrapped between head 6 and disc 5 to urge shaft 6' to its raised position and provides an electrical connection between shaft 6' and disc 5.

A pair of spaced flash electrode engagable contact elements, not shown, are positioned in the known manner, in an annular groove in the top face of the adapter between its outer peripheral wall and socket member 3. One of the contact elements is connected by way of disc 5, spring 7, head 6, shaft 5, shaft 13 and spring arm 14 to one terminal of a conventional shutter synchronized flashing network in the camera, the other terminal of which is connected through shoe mount 9 and coupling member 1 to the other contact element.

In the operation of the improved adapter mechanism with a flash cube, the flash cube adapter is mounted on the camera by sliding coupling members 1 and 9 into mutual engagement with shafts 13 and 6' in axial alignment. The stem of a flash cube 15 is inserted into socket member 3 where it is releasably locked by spring 4 to lower head 6 and shaft 6', the socket member 3 being angularly oriented so that the shafts are in matching positions with their faces coplanar. The lowering of shaft 6' brings it into drive engagement with the bore in the drive member 10 and into coupling therewith and also brings it into electrical engagement with shaft 13 which it lowers against the influence of contact spring 14. The flash cube may then be employed in the usual manner, the flash cube being advanced a 90° increment with the film advance and brought into coupling with the camera flash network, as earlier explained.

As shown in FIG. 3 the flash gun which may be substituted for the flash cube adapter includes a metal tubular mounting leg 16 terminating in outwardly projecting flanges which are adapted to tightly releasably engage the channels in shoe mount 9. A tubular insulator tube 19 telescopes mounting leg 16 and a metal contact ball 18 is slidably positioned in insulator tube 19 and is urged toward a position partially projecting through the end thereof by a metal compression spring 17 located in tube 19, means being provided to prevent the complete ejection thereof. The ball 18 is connected by way of spring 17 to one of the flash tube socket contacts the other contact being connected to leg 16.

To replace the flash cube adapter with the flash gun the flash cube 15 is removed to release shaft 6' which is spring urged to its raised position as shown in FIG. 1. The flash cube adapter is then separated by sliding coupling member 1 out of engagement with shoe mount 9. The coupling end of the flash gun tube 16 is then slid into engagement with shoe mount 9, ball contact 18 being raised until it is in axial alignment with shaft 13, at which position it is spring urged into engagement with shaft 13 which is somewhat lowered. The flash gun is thus supported by the camera and electrically coupled to the camera synchronizing flash network.

While there has been described and illustrated a preferred embodiment of the present invention it is apparent that numerous alterations, omissions and additions may be made without departing from the spirit thereof.

What is claimed is:

1. In combination with a camera including a photoflash device coupling and drive mechanism comprising a rotatable drive member having an axial bore of non-circular transverse cross-section adapted to releasably engage a mating shaft of a flash cube adapter, a first contact element registering with said bore, and means including a first coupling member for releasably engaging a photoflash device having a second contact element adapted to separably engage said first contact element, said first contact element comprising a first metal shaft of a cross-section corresponding to that of said bore and spring urged to a raised position with its top not projecting above the level of said coupling member, a flash tube adapter comprising a second coupling member releasably engaging said first coupling member, a body member of insulating material including an outer section fixed to said second coupling member and an inner section rotatable about a vertical axis and provided with an axial socket for receiving and releasably engaging the stem of a flash cube, a second metal shaft corresponding in transverse cross-section to said first shaft and rotatable with an axially slideable relative to said adapter inner section between a depressed advanced position engaging said drive member bore and said first shaft in response to the engagement of a flash cube stem by said axial socket and a raised retracted position above the level of said second shaft to its retracted position.

2. The combination of claim 1 including a pair of first and second contact members mounted on said body member stationary section, means electrically connecting said first contact member to said second shaft and means connecting said second contact member to said second coupling member.

3. The combination of claim 1 wherein one of said coupling members includes a pair of laterally spaced longitudinally extending channel members having confronting openings and the other of said coupling members includes a pair of laterally spaced longitudinally extending channel members having outwardly directed openings, one of the legs of each channel member slidably engaging the respective channel of the opposite coupling member.

4. In a camera, a photoflash device coupling and drive mechanism comprising a rotatable drive member having an axial bore of non-circular transverse cross-section adapted to releasably engage a mating shaft of a flash cube adapter, a first contact element registering with said bore, and means including a first coupling member for releasably engaging a photoflash device having a second contact element adapted to separably engage said first contact element, a flash gun adapter including a metal tubular member provided at its lower end with a second coupling member releasably engaging said first coupling member, a metal ball slideably registering with said tubular member and restricted in axial movement to an advanced position partially projecting from said tubular member and movable to a retracted position within said tubular member, and spring means urging said ball to its advanced position.

5. The combination of claim 4 including a tube of insulating material lining the inside face of said tubular member and separating said ball therefrom.

6. The combination comprising a camera including a drive member (10) rotatable about a predetermined axis and having an axial bore of polygonal transverse cross section, a contact defining first shaft (13) of corresponding polygonal transverse cross section axially slideably engaging said axial bore, and a first coupling member (9) having an opening axially aligned with said first shaft, and a flash cube adapter including a second coupling member (1) releasably engaging said first coupling member (9), a flash cube receiving socket member (3) rotatable about said predetermined axis and a contact defining second shaft (6') coaxial with and of the same polygonal transverse cross section as said first shaft (13) and rotatable with said socket member and axially slideable into and out of end to end engagement with said first shaft (13) and into and out of engagement with said drive member socket.

7. The combination of claim 9 including first spring means axially urging said first shaft toward said second shaft, and second spring means (7) axially urging said second shaft away from said first shaft.

* * * * *